US000001495H

United States Statutory Invention Registration [19]

[11] Reg. Number: H1495

[45] Published: Oct. 3, 1995

Kirchner et al.

[54] TEST SPECIMEN FOR AN X-RAY LAMINOGRAPHIC SYSTEM

[75] Inventors: Kevin Kirchner, Bladensburg, Md.; Thomas A. Siewert; Mark W. Austin, both of Boulder, Colo.; John A. Adams, Escondido, Calif.

[73] Assignee: The United States of America as represented by the Secretary of the Army, Washington, D.C.

[21] Appl. No.: 41,371

[22] Filed: Apr. 1, 1993

[51] Int. Cl.[6] ..... G01N 23/00

[52] U.S. Cl. ..... 378/22; 378/21; 378/58; 378/207

[58] Field of Search ..... 378/207

[56] References Cited

U.S. PATENT DOCUMENTS 4,926,452 5/1990 Baker et al. .
5,081,656 1/1992 Baker et al. .
5,097,492 3/1992 Baker et al. .

OTHER PUBLICATIONS

Electronic Manufacturing, Feb. 1969, Bruce Baker, pp. 20–22.
American Society for Testing and Materials (ASTM) standards E 747–90, pp. 308–312; and E1025 (Reapproved 1989), pp. 420–425.
X–Ray Tomographic Nspection of Printed Wiring Assemblies and Electrical Components, Air Force Systems Command report for Jul. 1989 to Jun. 1990; Richard H. Bossi and Robert J. Kruse; pp. 65 and 67.
Four Pi Systems Corporation, San Diego, Calif.; 1988, 12 pages and
Proceedings of the Technical Program, National Electronic Packaging and Production Conference, Jun. 10–13, p. 5.

*Primary Examiner*—Bernarr E. Gregory
*Attorney, Agent, or Firm*—Saul Elbaum; Muzio B. Roberto

[57] ABSTRACT

A test specimen for use in an x-ray laminographic system for finding previously undetected defects in solder joints of a circuit board. The system includes an x-ray inspection machine having a specimen stage which is mounted to move in the x-, y-, and z-dimensional planes and a detector which is mounted to detect the generated three dimensional image data. The test specimen has a right triangular prism configuration with critical dimensions. During the inspection operation, x-rays are angularly directed to the test specimen and the rays exiting therefrom form multiple slice images for computerized processing. These images are compared with images of the test specimen for evaluating the solder defects.

11 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEST SPECIMEN FOR AN X-RAY LAMINOGRAPHIC SYSTEM

GOVERNMENTAL INTEREST

The invention described herein may be manufactured, used, and licensed by or for United States Government without payment to us of any royalty thereon.

BACKGROUND OF THE INVENTION

1. Field of invention

The present invention relates to a test specimen for use in an x-ray laminographic system. More specifically, the invention relates to a test specimen for use in an x-ray laminographic system for finding previously undetected defects in solder joints of a circuit board.

2. Description of the Prior Art a. Background

X-ray inspection of a circuit board is an important quality control tool, even though the concept has been used for many years. One reason for this continued popularity is its ability to nondestructively examine the interior of a circuit board. However, using traditional x-ray inspection techniques, industry cannot economically cope with the dual problem of more chips per board and decreasing board surface. One solution is the use of scanned beam laminography wherein an x-ray beam source and an x-ray detector synchronously move to form a focal plane through a cross-sectional area of the board. The synchronous movement of the beam and detector creates a "slice" image through the board. At the present time, laminography is one of the most efficient technologies for producing a satisfactory inspected circuit board for the commercial market.

b. Specific Prior Art

X-ray inspection is a convenient way to observe underneath components to check for hidden solder joints for a circuit board. Conventional x-ray images reduce an object to a two-dimension shadowgraph and they lose the three-dimensional shape of the object. Scanned beam laminography (SBL) addresses these limitations. With SBL, it is not necessary to tilt and/or rotate the circuit board to see all sides or to project the solder connection into a clear field of view. The technique permits the board to lay flat because neighboring components do not obscure the slice images. The basic principle of SBL is to move some combination of the x-ray source, detector, and object being inspected in synchronism while the image is being formed (ELECTRONIC MANUFACTURING, Feb. 1989; Bruce Baker; pages 20–22).

Laminography (body-section tomography, or focal plane tomography) is a term given to techniques which generate a focussed plane of information in an object while defocussing surrounding planes. By defocussing planes above and below a plane of interest, the structures that are not of interest will be blurred., thus reducing their overall contrast effect in the image. The structure at the plane of interest will remain in focus and in the final image will be observed with improved sensitivity to detail. Computer tomography (CT) uses x-ray transmission information from numerous angles about an object to computer reconstruct cross-sectional images or slices of the interior structure. To generate a CT image, x-ray transmission is measured by an array of detectors. Data is obtained by translating and rotating the object so that many viewing angles about the object are used. A computer mathematically reconstructs the cross-sectional image from the multiple view data collected. The image data points are small volumetric measurements directly related to the x-ray attenuation coefficient of the material present in the volume elements defined by the slice thickness and the horizontal resolution capability of the CT system. A primary benefit of CT is that features are not superimposed in the image, thus making it easier to interpret than radiographic projection images and providing quantitative date for dimensional and material density/constituent measurements (X-RAY TOMOGRAPHIC INSPECTION OF PRINTED WIRING ASSEMBLIES AND ELECTRICAL COMPONENTS; Air Force Systems Command report for July 1989 to June 1990; Richard H. Bossi and Robert J. Kruse; pages 65 and 67).

The scanned beam x-ray inspection system allows the x-ray portion to remain stationary and to move the circuit board in the x-,y-, and z-directions to collect slice images. An x-ray detector is rotated synchronously with the system, captures images, and transfers them to computerized outputs. The system automatically detects circuit faults (FOUR PI SYSTEMS Corporation, San Diego, Calif.; 1988; 8-page commercial brochure).

Attention is directed to the publication, PROCEEDING OF THE TECHNICAL PROGRAM, NATIONAL ELECTRONIC PACKAGING AND PRODUCTION CONFERENCE, Jun. 10–13, 1991, page 5 wherein a broad disclosure of the present invention is recited.

SUMMARY OF THE INVENTION

The present invention relates to a test specimen for use in an x-ray laminographic system for finding previously undetected defects in solder joints of a circuit board.

Accordingly, it is an object of the invention to provide a high-speed real-time x-ray inspection machine laminographic system including a test specimen which serves as a physical standard for the system performance.

It is an additional object of the invention to provide an x-ray laminographic system including a test specimen having a right triangular prism configuration having critical dimensions.

Other objectives of the present invention will be apparent from the following detailed description of the invention.

BRIEF DESCRIPTION OF THE DRAWINGS

The foregoing and other objects, aspects, uses and advantages of the present invention will be more fully appreciated as the same becomes better understood when considered in connection with the following accompanying drawings, in which.

FIG. *5a* to *5d* illustrate perspective views of the test specimen being irradiated by an x-ray beam at different positions.

FIG. *6a* to *6d* illustrate frontal views of formed slice images of the test specimen on a TV monitor.

DETAILED DESCRIPTION OF THE INVENTION

Figure 1:
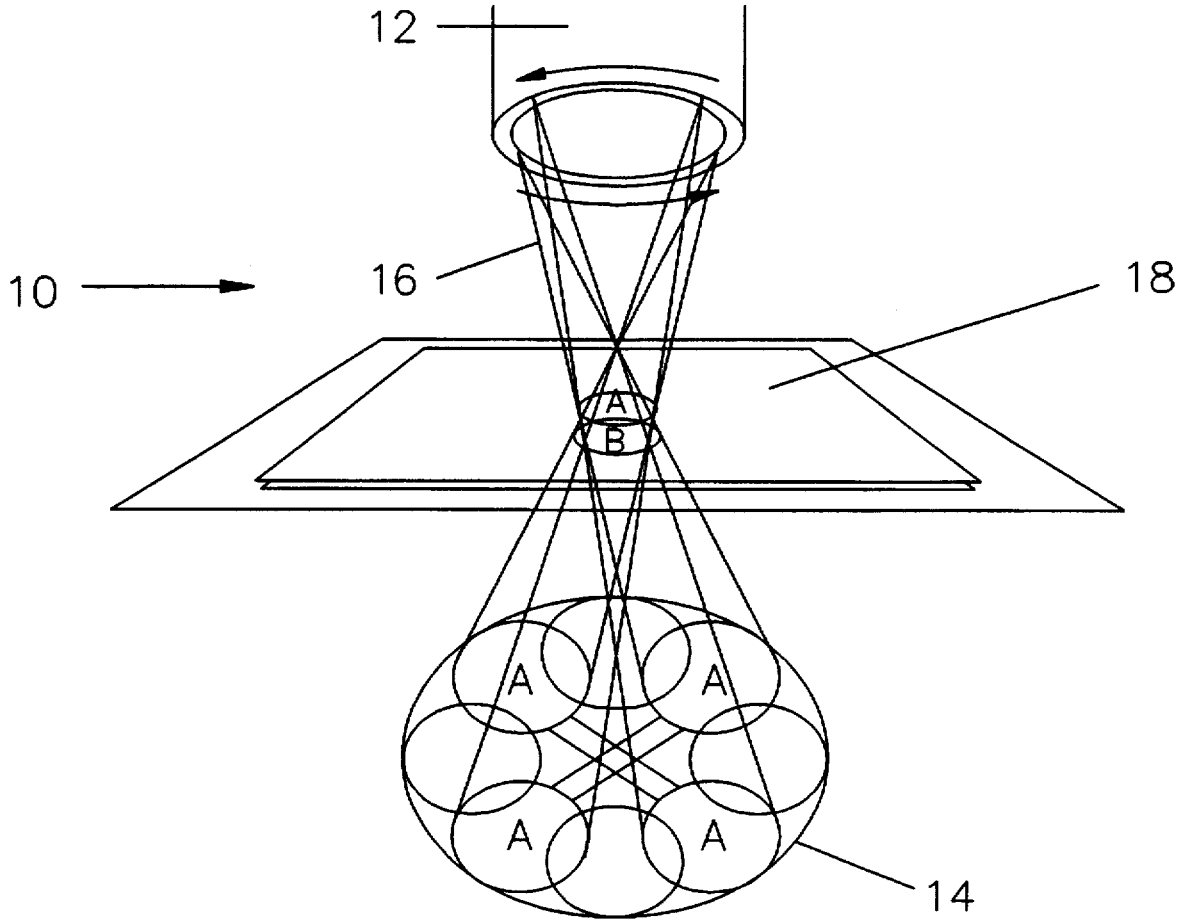
FIG. 1 illustrates a perspective view of a prior art x-ray laminographic system.

FIG. 1 discloses a prior art x-ray inspection system developed by FOUR PI SYSTEMS Corporation, San Diego, Calif. The system is illustrated on page 22 of the reference to Baker (supra). In FIG. 1 the system 10 has an x-ray beam source 12 and a detector 14 which capture the formed slice images and transfer them to an image processor (not shown). Scanning x-ray beams 16 can slice through a circuit board (not shown) on focal plane 18. Cross-sectional images of the board show 3-dimensional information and eliminate overlaying shadows. Four positions along the circle of rotation are shown. The plane A remains at the same place on the detector 14, but plane B is moving with respect to the detector 14, owing to the shifting parallax of the scanned beams 16. When the images are averaged together, the image of A remains, but the image of B is "smeared" into the background.

Figure 2:
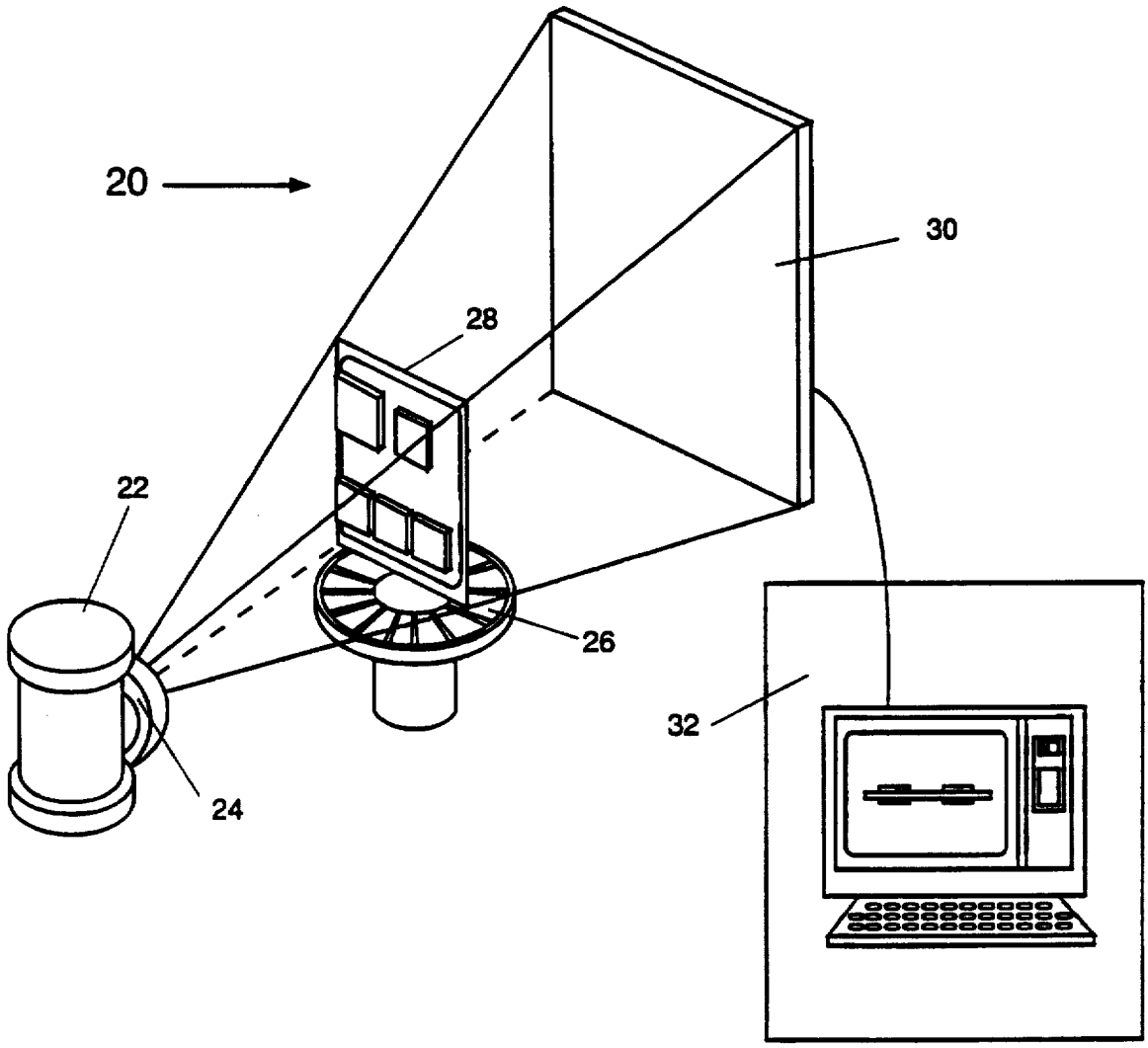
Prior Art FIG. 2
FIG. 2 illustrates a perspective view of another prior art x-ray laminographic system.

FIG. 2 discloses another prior art x-ray inspection system which was developed for Air Force Systems Command (AFSC), Wright-Patterson Air Force Base, Ohio, by Boeing Aerospace and Electronics. The system is illustrated on page 65 of the AFSC reference (supra). In FIG. 2 a computer tomography system 20 comprises an x-ray source 22, a source collimator 24, a turntable 26, a circuit board 28, a linear detector array 30 and an image processor 32 (TV monitor). The x-ray source 22 and the detector array 30 are stationary.

Prior art techniques are hindered by distorted images which are formed when overlying features block the potential solder defects. Laminography solved this problem by isolating only the important features at each level of the board. The defects are obvious because a slice image at two different levels clearly reveals two different footprints. Even a blind connector can be inspected by taking several slices through it. The cited prior art teaches the technique for moving the x-ray beam source in the x-, y-, and z-planes to find the solder defects. In the field of laminography, the x-ray beam impinges upon the test specimen at an angle. If the test specimen, for example, is a rectangular block, more material is needed to be passed through.

Figure 3:
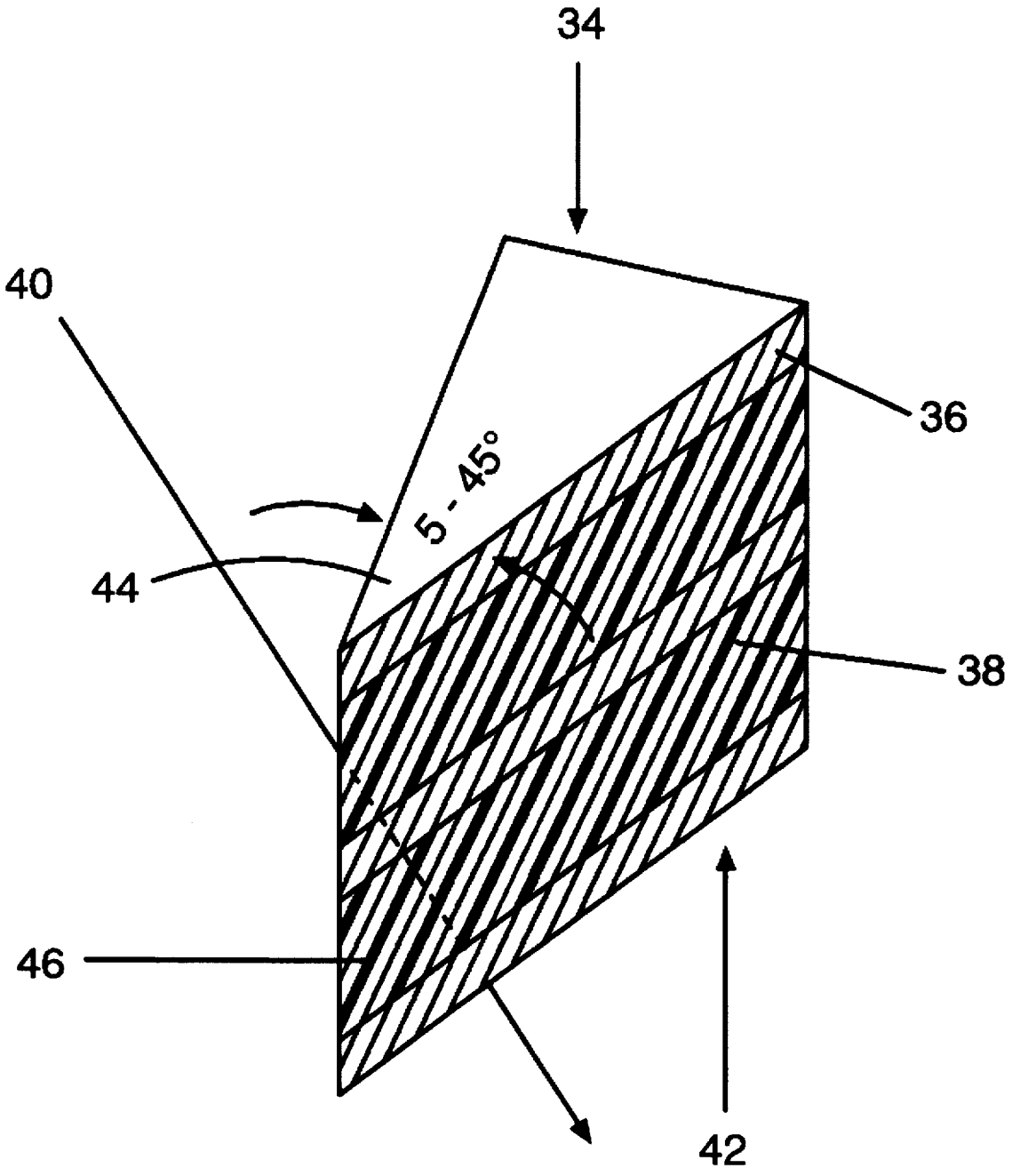
FIG. 3 illustrates a perspective view of a test specimen for an x-ray laminographic system in accordance with the present invention.

FIG. 3 shows a test specimen 34 for use in an x-ray machine inspection laminographic system in accordance with the present invention. Another name for test specimen in the art is image quality indicator (IQI). The test specimen 34 is composed of a stack of alternating thin layers 36 and thick layers 38. The thin layers 36 are the high contrast material layers and the thick layers 38, the low contrast material layers. The test specimen 34 is shaped as a right triangular prism which shape was determined to be the most desirable after extensive experimentation. X-ray beam 40 impinges upon the test specimen 34 at an angle. Therefore, all the material in a vertical direction will not necessarily be traversed if the test specimen 34 is x-rayed at its edge. Thus, the right triangular prism shape allows the use of more absorptive type of material than would otherwise be possible if the test specimen was not right triangular prism shaped and if all the layers had to be passed through.

An x-ray beam 40 penetrates an inner sidewall (not shown) and exits from an outer sidewall 42. The x-ray beam 40 is directed towards narrow width section 44 near an edge 46 of the test specimen 34. The narrow width section 44 between the inner sidewall and the outer sidewall 42 near the edge 46 presents less material to pass through. By limiting the penetration of the beam 40 through the narrow width section 44, image clarity is optimized by minimizing the amount of information that has to be removed during the formation of the sectional slice images and during the observation of the slice images. Further, the right triangular prism shape permits the use of more absorptive materials than would otherwise be possible. The use of the dense materials provides finer resolution and stronger contrast to the formation of the slice images. The shape allows the test specimen to be both large and small at the same time. Large enough at its width to be easily found and imaged (making testing practical), while at the same time being small enough at its narrow section 44 to test the limits of the resolution of the machine. Extensive experimentation was performed to determine its critical dimensions. The range of dimensions for the test specimen 34 are: 10 to 75 millimeters for the length; 5 to 50 millimeters for the width; and 5 to 50 millimeters for the height. The acute angle for the narrow width section 44 between the inner sidewall and the outer sidewall 42 is in the range of 5 to 45 degrees. Thus, two significant features of the test specimen 34 are its shape and its dimensions.

Certain types of materials are used to fabricate the test specimen 34. Copper and tantalum were selected in view of their high absorptive characteristic. Polymer materials such as resin filament composite materials which consist of epoxies and fiberglass were selected in view of their low absorptive characteristic. Copper and tantalum have much higher x-ray absorption than the resin filament composite materials. At or near the thickness equal to the machine's resolution limit, the resin filament composite materials provide high enough contrast with respect to the high absorptive materials. The thickness of the low absorptive materials are dictated by the requirement that the total thickness of the test specimen 34 should be in the overall z-dimension range of the system under test. This overall dimension is on the order of 10's of millimeters. Each of the thickness of the copper or tantalum layers is in the range of 0.01 millimeters to 1 millimeter and thickness of the resin filament composite layers is in the range of 0.05 millimeters to 0.3 millimeters. Accordingly, the copper or tantalum has a much higher x-ray absorptive quality than that of the resin filament composite materials. The high and low characteristics of the materials differ by at least a factor of 2 in their x-ray absorption.

Figure 4:
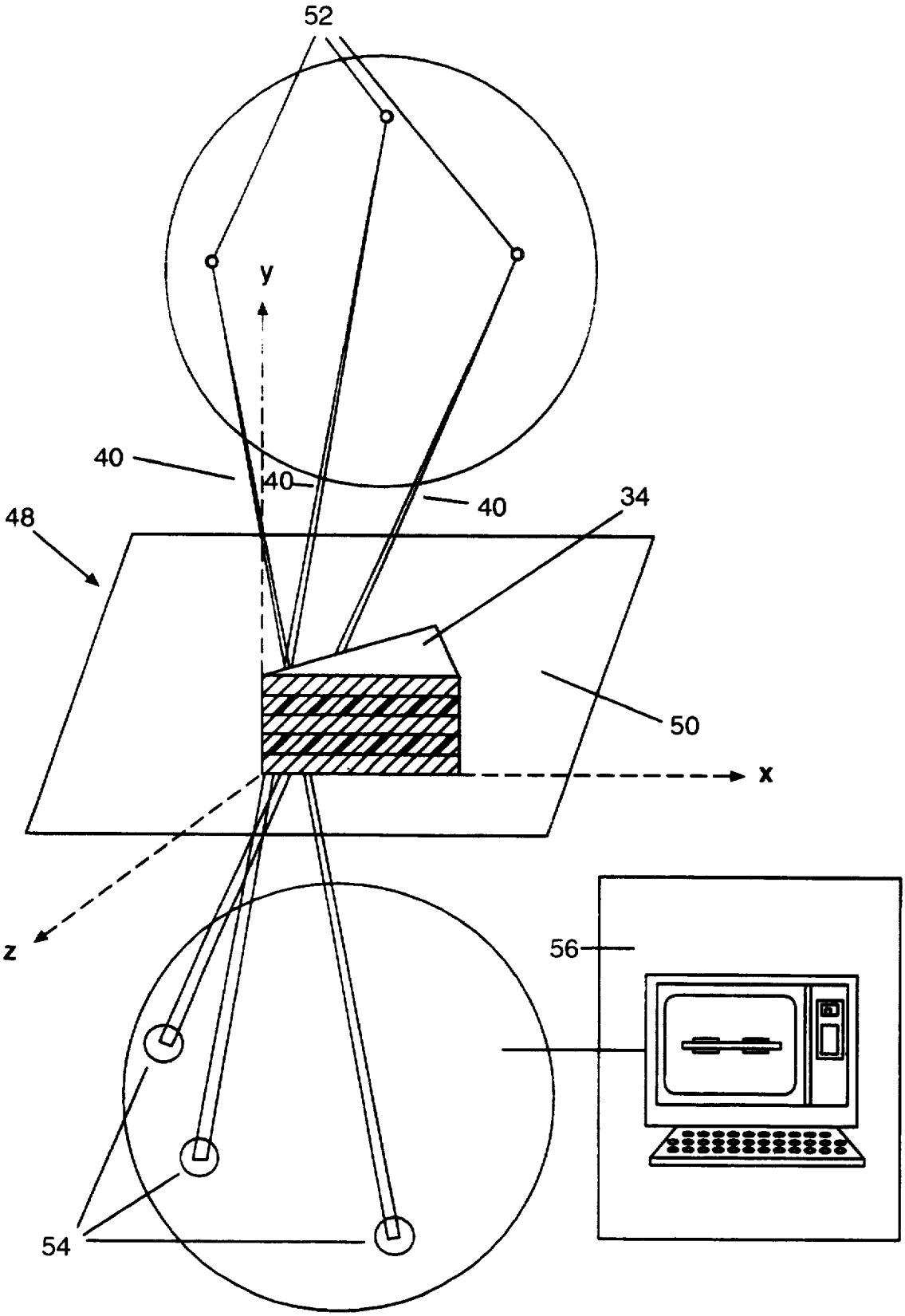
FIG. 4 illustrates a perspective view of the x-ray laminographic system.

FIG. 4 shows an x-ray inspection machine laminographic system 48 including the test specimen 34. The test specimen 34 is positioned on a stationary focal plane or support 50 between an x-ray source 52 and a detector 54. The x-ray source 52 is mounted to move in the x-, y-, and z-planes and the detector 54 is mounted to gather or detect three-dimensional image data. A common type of detector is an image intensifier tube. Three different positions are shown in FIG. 4 for the x-ray source 52 and the detector 54. The x-ray source 52 directs a plurality of x-rays beams 40 to penetrate through the test specimen 34, resulting in the formation of multiple slice images which are gathered or detected by the detector 54. The detected slice images are sent to a computer unit 56 which includes an image processor or a TV monitor. A circuit board that is to be tested can be substituted for test specimen 34. The formed slice images of the tested board are compared with those of the test specimen 34 and thereby solder defects on the circuit board may be detected and evaluated.

Figure 6A:
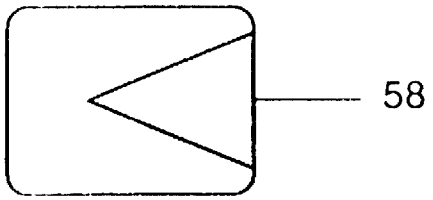
Figure 6B:
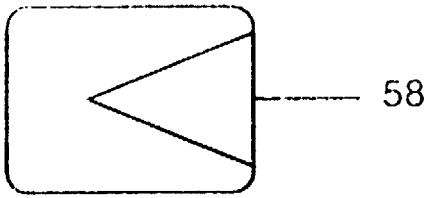
Figure 6C:
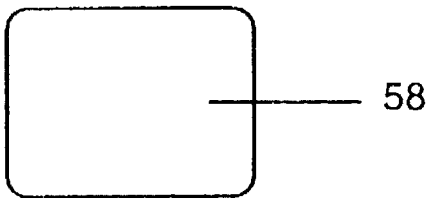
Figure 6D:
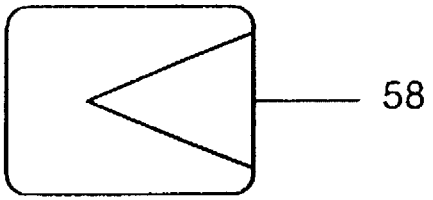
Figure 5A:
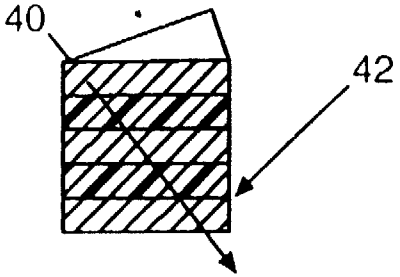
Figure 5B:
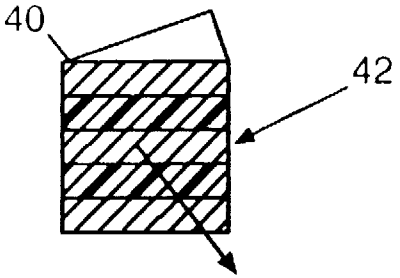
Figure 5C:
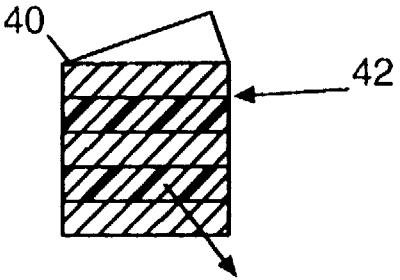
Figure 5D:
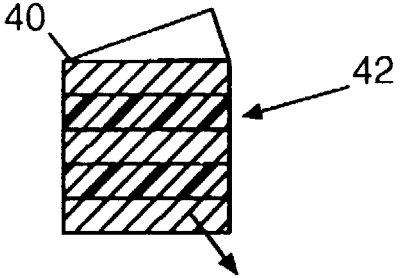

FIGS. *5a–5d* show the x-ray beam 40 directed at four different positions on the inner sidewall and exiting therefrom on the outer sidewall 42 of the test specimen 34. The x-ray movement is made in increments corresponding to the high and low contrast layers of the test specimen 34. In FIGS. *6a* to *6d* the detected formed slice images are seen on screen 58 of a TV monitor. In FIGS. 5*a* and 5*b* the beam 40 is focused at high contrast layers, resulting in dark triangular shaped images on screen 58 in FIGS. 6*a* and 6*b*, respectively. In FIG. 5*c* where the beam 40 is focused on a low contrast layer, no image is visible on the screen 58 in FIG. 6*c*. In FIG. 6*d* on a high contrast layer, another dark triangular shaped image is seen on the screen 58. In a normal operation, the generated image data would provide clear and concise readouts related to dimensions/distances for evaluating the solder defects on the board.

The operation of the x-ray inspection machine system of the present invention is as follows:

The x-ray inspection machine is calibrated by using the test specimen with its fixed standards to develop similar standards for the inspection machine. The circuit board to be tested is positioned on the focal plane support between the x-ray source and the detector. The x-ray inspection machine having a specimen stage is mounted to move in the x-, y-, and z-planes. The board is irradiated by the beams from the x-ray source whereby multiple slice images of the board are formed which slice images are similar to the slice images of the test specimen. The multiple slice images are gathered or detected by the detector. The image processor (TV monitor) is used for observation of the formed images and is part of the computerized system for comparing and evaluating the images of the test specimen and the tested circuit board.

Obviously, numerous modifications and variations of the present invention are possible in light of the above teachings. The test specimen of the x-ray laminographic system of the present invention can be used in diverse arts such as electronics, metallurgy, medical, and industrial tomography. It is therefore to be understood that the present invention can be practiced otherwise than as specifically described herein and still will be within the spirit and scope of the appended claims.

What is claimed is:

1. An x-ray laminographic system for finding defects in an object, comprising in combination:

an x-ray means for directing x-rays and mounted to move in x-, y-, and z-dimensional planes;

a test specimen having a right triangular prism shape and being positioned below the x-ray means;

the test specimen having the following range of dimensions: 10 to 75 millimeters for the length, 5 to 50 millimeters for the width, and 5 to 50 millimeters for the height;

the directed x-rays operatively angularly penetrating the test specimen and exiting therefrom to form three-dimensional multiple slice images;

a detector means mounted below the x-ray source for gathering the slice images; and means for processing the gathered slice images whereby the defects in the object may be observed.

2. The system as defined in claim 1 wherein the test specimen consists of layers of absorptive copper and polymer materials.

3. The system as defined in claim 1 wherein the test specimen consists of layers of tantalum and polymer materials.

4. The system as defined in claim 1 wherein the polymer materials are resin filament composite materials.

5. The system as defined in claim 1 wherein the resin composite materials consists of epoxies and fiberglass.

6. An x-ray laminograph system for finding defects in an object, comprising in combination:

an x-ray means for directing x-rays and mounted to move in x-, y-, and z-dimensional planes;

a test specimen having a right triangular prism shape and being positioned below the x-ray means;

the test specimen having the following range of dimensions: 10 to 75 millimeters for the length, 5 to 50 millimeters for the width, and 5 to 50 millimeters for the height;

the test specimen consisting of layers of absorptive copper and polymer materials;

the polymer materials consisting of epoxies and fiberglass;

the directed x-rays operatively angularly penetrating the test specimen and exiting therefrom to form three-dimensional multiple slice images;

a detector means mounted below the x-ray source for gathering the slice images; and means for processing the gathered slice images whereby the defects in the object may be observed.

7. A method for an x-ray laminographic system for finding defects in solder joints of a circuit board, comprising in combination the following steps:

directing x-rays from an x-ray source;

the x-ray source mounted to move in the x-, y-, and z-dimensional planes;

positioning a right triangular shaped test specimen below the x-ray source;

the test specimen having the following range of dimensions: 10 to 75 millimeters for the length, 5 to 50 millimeters for the width, and 5 to 50 millimeters for the height;

the directed x-rays operatively angularly penetrating the test specimen and exiting therefrom to form three-dimensional multiple slice images;

mounting a detector below the x-ray source to detect the formed slice images; and processing the detected formed images whereby the solder defects in the circuit board may be evaluated.

8. The method as defined in claim 7 wherein the test specimen consists of layers of absorptive copper and polymer materials.

9. The method as defined in claim 7 wherein the test specimen consists of layers of tantalum and polymer materials.

10. The method as defined in claim 7 wherein the polymer materials are resin filament composite materials.

11. The method as defined in claim 7 wherein the resin composite materials consists of epoxies and fiberglass.

* * * * *